E. H. WAUGH.
WEIGHT TESTING MACHINE.
APPLICATION FILED NOV. 20, 1912.

1,229,838.

Patented June 12, 1917.
4 SHEETS—SHEET 1.

Witnesses
James E. Sproll.
Clara A. Harn.

Inventor
Edward H. Waugh.
By Adams & Brooks
Attorneys

E. H. WAUGH.
WEIGHT TESTING MACHINE.
APPLICATION FILED NOV. 20, 1912.

1,229,838.

Patented June 12, 1917.
4 SHEETS—SHEET 4.

Witnesses
James E. Sproll.
Clara A. Harm.

Inventor
Edward H. Waugh.
By Adams & Brooks
Attorney

UNITED STATES PATENT OFFICE.

EDWARD H. WAUGH, OF SEATTLE, WASHINGTON, ASSIGNOR TO SMITH CANNERY MACHINES COMPANY, OF SEATTLE, WASHINGTON, A CORPORATION OF WASHINGTON.

WEIGHT-TESTING MACHINE.

1,229,838.  Specification of Letters Patent.  Patented June 12, 1917.

Application filed November 20, 1912. Serial No. 732,540.

*To all whom it may concern:*

Be it known that I, EDWARD H. WAUGH, a citizen of the United States of America, and a resident of the city of Seattle, in the county of King and State of Washington, have invented certain new and useful Improvements in Weight-Testing Machines, of which the following is a specification.

My invention relates to machines of the above type, having more particular reference to those machines adapted for weighing canned goods, and has for a primary object the provision of an apparatus by which the cans or other articles can be tested and assorted, according to weight, in an efficient manner.

My invention has for a further object to provide a novel placing or depositing mechanism.

Further, the invention resides in the provision of plural weight testing mechanisms combined with mechanism for feeding selected tested cans from one to the other thereof.

A further object of my invention is to provide novel mechanism for locking or holding a weight testing mechanism at intervals.

Further, the invention aims to provide novel mechanism for assorting the light and heavy cans or articles from those of a standard or of a substantially predetermined weight.

Other objects will be set forth as my description progresses and those features of construction, arrangements and combinations of parts on which I desire protection, succinctly defined in my annexed claims.

Referring to the accompanying drawings wherein like numerals of reference indicate like parts throughout:

Fig. 11 is a fragmentary detail in partial section of one of the yielding driving connections, and Fig. 12 is a perspective of a can stop.

Figure 1:
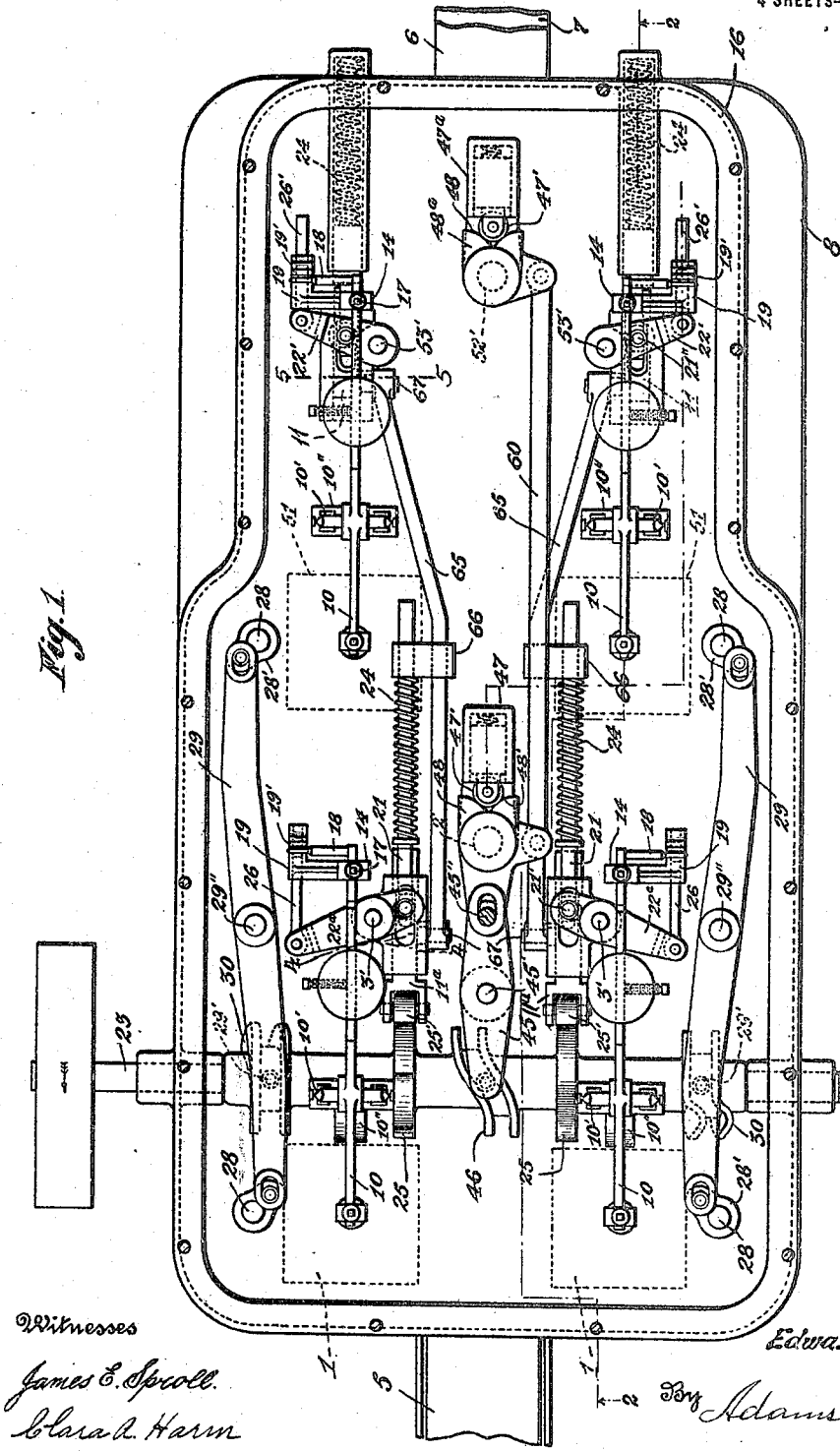
Figure 1 is a top plan of my invention, the top wall of the casing or cover being removed and the end portions of the endless conveyer being broken away.

In the construction shown, I provide a weight testing means for effecting a primary test of the cans or articles, the same conveniently comprising a pair of scales 1 with which are associated placing or depositing means, as 2, an assorting device comprising switches 3, and a shifting or ejecting mechanism comprising devices 4.

Reference numeral 51 indicates weight testing means for effecting a further test of cans advanced from weight testing means 1, the same, like testing means 1, conveniently comprising a pair of scales with which are associated placing or depositing means 52, an assorting device comprising switches 53, and a shifting or ejecting mechanism comprising devices 54.

Placing or depositing means 2 and 52 each comprise a plurality of vertically spaced fingers of an arm $2^a$, fixed to the depending end portions of respective vertical shafts $2'$, $52'$, journaled in an upper frame section 16, and are arranged in advance of switches 3, 53 respectively and between the adjacent scales.

Switches 3, 53 comprise horizontally disposed arms fixed to shafts $3'$, $53'$, journaled in and depending from frame section 16.

In conjunction with the mechanism just set forth, I have provided feed conveying means, indicated at 5 and $5^a$, and a delivery conveying means 6, the said conveying means $5^a$ conveniently comprising an intermediate portion, and the said conveying means 5 and 6 comprising respective end portions of the upper run of an endless belt 7, which upper run is seated in a longitudinally extending groove or way formed in the upper face of a base plate 8, which latter combined with the frame section 16 and suitable intermediate uprights 15, constitutes the main supporting frame of the machine.

Scales 1 and 51, the former of which are arranged forwardly of the latter, have their platforms arranged on opposite sides of conveying means 5, 5ª respectively, across which the placing or depositing devices 2, 52 move to feed to the adjacent scales alternately.

Figure 3:
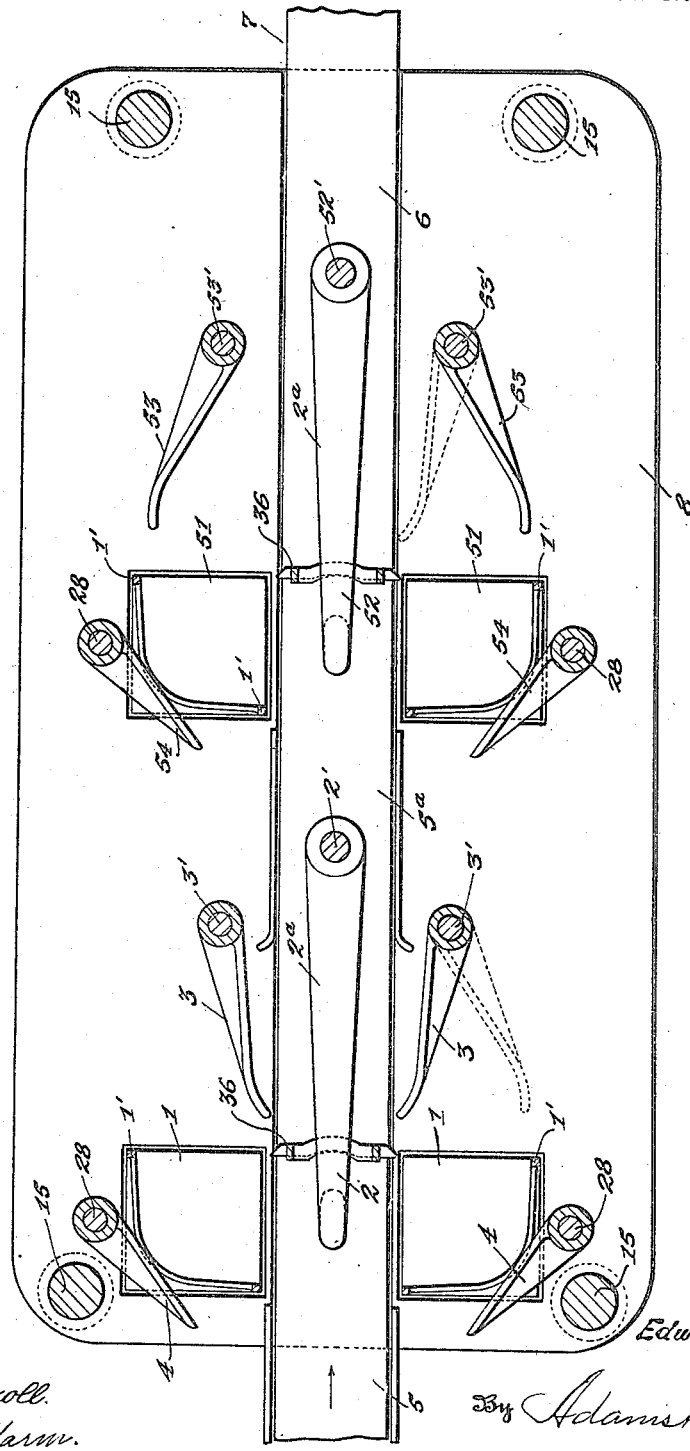
Fig. 3 is a horizontal section taken on line 3—3 of Fig. 2.
Figure 4:
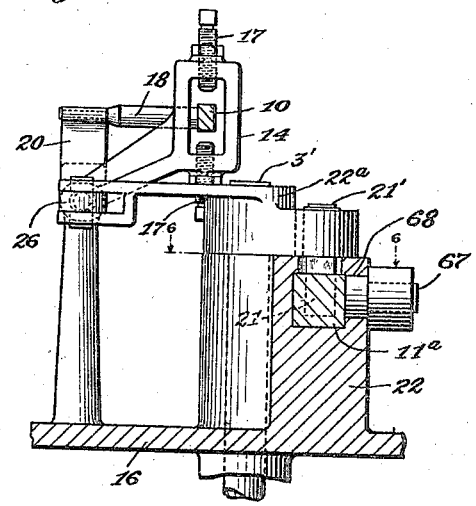
Fig. 4 is a fragmentary vertical transverse section on line 4—4 of Fig. 1.
Figure 5:
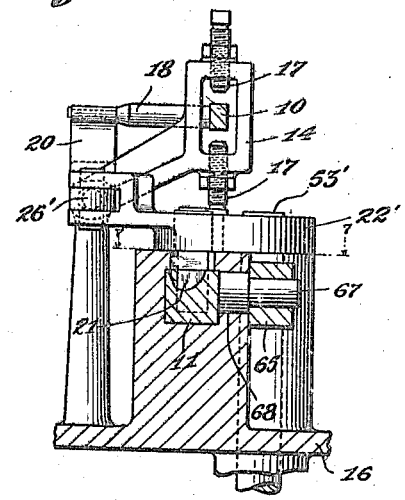
Fig. 5 is a similar section on line 5—5 of Fig. 1.
Figure 6:
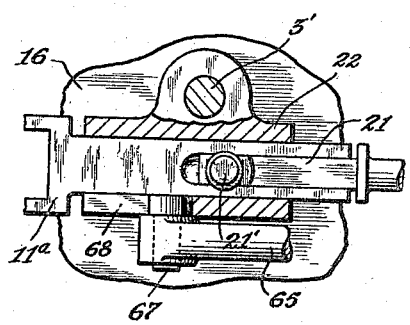
Fig. 6 is a horizontal section on line 6—6 of Fig. 4.
Figure 7:
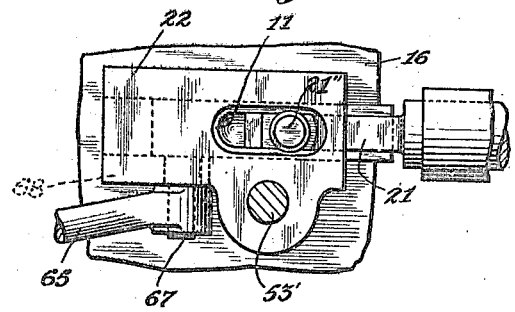
Fig. 7 is a horizontal section on line 7—7 of Fig. 5.

Devices 4 and 54 are each associated with a respective scale for movement across the face of its platform to thereby remove the tested cans, the said devices 4 throwing the cans against respective assorting switches 3, while the devices 54 act in like manner with respect to switches 53. In this connection it will be observed (see Fig. 3) that switches 3 normally lie across the path of travel of the cans from scales 1 to conveying means 5ª, while switches 53 are normally set to direct the cans from scales 51 to conveying means 6. Therefore, switches 3 are designed to be under control of those cans of a predetermined weight and also those cans which are relatively heavy or in excess of such standard or predetermined weight, to be adjusted outwardly thereby, as indicated by broken lines in Fig. 3, by which construction such cans are directed inwardly to the conveying means 5ª, while the "light" cans, or those underweight are ejected from respective sides of the machine, by the switches with the latter standing in their normal positions. Switches 53 are adjusted inwardly by those cans exceeding the standard or predetermined weight to eject the same from respective sides of the machine, while the "standard" cans are directed onto conveyer 6 by the switches, with the latter standing in their normal positions.

These scales are identical in construction, and therefore a description of one will suffice. The scale platform is suspended for vertical movement in a suitable opening of base plate 8 by a yoke 1', said yoke being provided with a stem part extending through frame section 16 and pivotally connected with a scale beam 10 fulcrumed as at 10' on a stand 10" and having its weighted rear end portion projecting through an opening of a stand, as 14, provided with adjustable stops 17, and having its projecting end portion provided with a laterally projecting pin 18 on which a pendant engaging member 20 for controlling the operation of a switch actuator 21 is pivotally supported to be thereby free to be held by gravity in its vertical movement.

Each stand 14 is provided with a guide 19, which guide is formed with an opening, and one side wall of said opening constitutes a fixed jaw against which engaging member 20 is held, in a manner to be hereinafter set forth.

Figure 2:
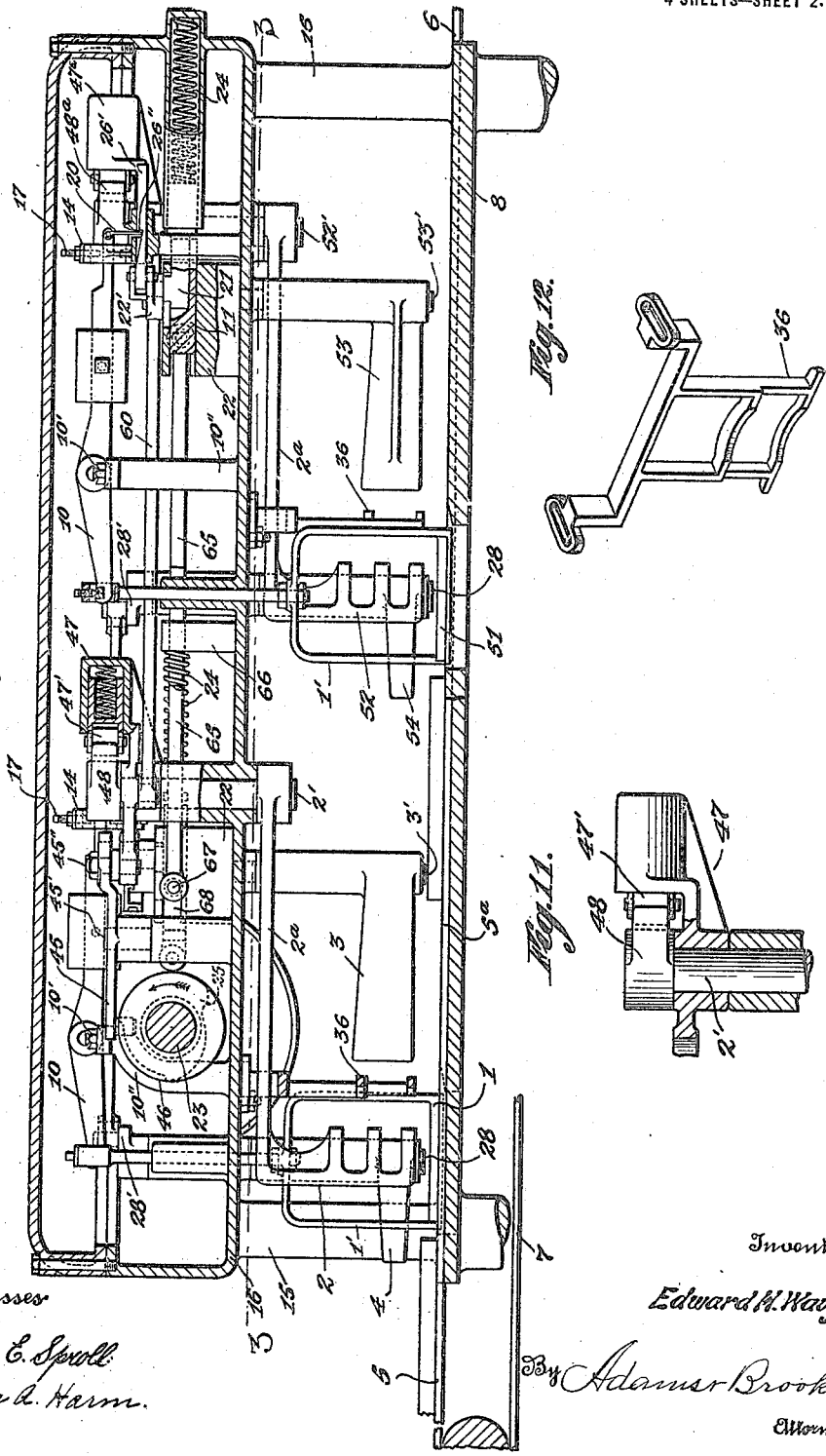
Fig. 2 is a longitudinal section taken on line 2—2 of Fig. 1, parts being broken away.
Figure 8:
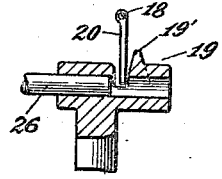
Figs. 8 and 9 are fragmentary vertical sections of the locking devices of the forward and rearward scales respectively.

Reference numeral 19' indicates an inclined lip at the outer or entrance end of the opening of guide 19 to facilitate the inward or seating movement of member 20, as will be readily understood by reference to Figs. 2 and 8 of the drawings.

Switch actuators 21 comprise slides each of which is slidably engaged in another slide, the rearwardly disposed actuators being engaged in slides 11, and the forwardly disposed actuators being similarly supported in slides 11ª. Slides 11, 11ª are mounted in respective guides 22, consisting of stands, for movement toward and from a drive shaft 23. Springs 24 engaged with actuators 21 tend to force the same and the adjacent slides 11, 11ª toward said shaft and thereby bring bearing rollers 25' of slides 11ª into the path of respective cams 25, which latter are set to control slides 11ª for operation in an alternative manner, as hereinafter set forth.

To normally hold or lock actuators 21 against movement, I provide mechanism now to be described. Each actuator 21 of scale mechanisms 1 is pivoted at 21' to a lever 22ª which is fixed intermediate its ends to the shaft 3' of the switch 3 and pivotally connected at its outer end with a jaw 26, slidably engaged in guide 19 and adapted to have its inner end projected rearwardly into engagement with member 20 to clamp the same against the rear wall of the guide opening.

Actuators 21 of the scale mechanisms 51 are each pivoted at 21" to a respective lever 22', fixed at its inner end to the shaft 53' and pivotally connected at its outer end with a jaw 26', which jaw is provided with an angular engaging portion or shoulder 26" adapted to clamp the adjacent engaging member 20 against the forward wall of the guide opening.

When engaging members 20 are in lowered position, springs 24, acting on actuators 21, tend to hold said members against the adjacent fixed jaws and thereby lock the scales.

Cams 25 are fixed on drive shaft 23 and intermediate these cams, I provide a two throw cam 46 in the groove of which a follower on a lever 45 engages. Lever 45 is fulcrumed at 45', and pivotally connected at its rear end portion, as at 45" with a driving element 47 of a yielding driving connection for the placing or depositing device 2.

Element 47 is mounted for free rocking movement on shaft 2' (see Fig. 1), and is provided with a yieldingly pressed engaging member 47', in the form of a roller, which is normally engaged in a seat 48' of the driven element 48 of the connection. Element 48 is fixed to shaft 2', and its seat 48' has outwardly diverging side walls over which engaging member 47' will travel should the movement of device 2 be resisted as through the sticking or jamming of a can or cans.

The placing or depositing device 52 has its shaft 52' provided with a fixed driven connection member 48ᵃ with which a drive member 47ᵃ is engaged, these parts forming a yielding driving connection of similar construction and operation to that described for operating device 2.

A link 60 connects driving elements 47, 47ᵃ by which construction the placing or depositing devices 2, 52 are operated simultaneously and in a common direction, while being free through their yielding driving connections to be held against movement by undue resistance offered to the movement of a can being fed.

Reference numeral 36 indicates guards extending crosswise of endless belt 7 to prevent cans from escaping devices 2, 52, and further serving to guide the cans during their movement by said devices.

Each shifting device 4, 54, comprises an arm fixed to a vertical oscillatory shaft 28, journaled in frame section 16 and disposed at the outer side edge of the related scale and having its upper end provided with a crank arm 28'.

Reference numeral 29 indicates levers disposed at respective sides of and longitudinally of endless belt 7 the same being fulcrumed at 29'' and connected at their end portions with the adjacent crank arms 28'.

Levers 29 are provided with followers 29' for engagement in the grooves of cams 30, fixed to shaft 23 and set to operate devices 4 to eject alternately. By this construction, one device 4 and one device 54 will be driven simultaneously to eject in an alternating manner with respect to the other devices 4, 54.

Figures 9, 10:
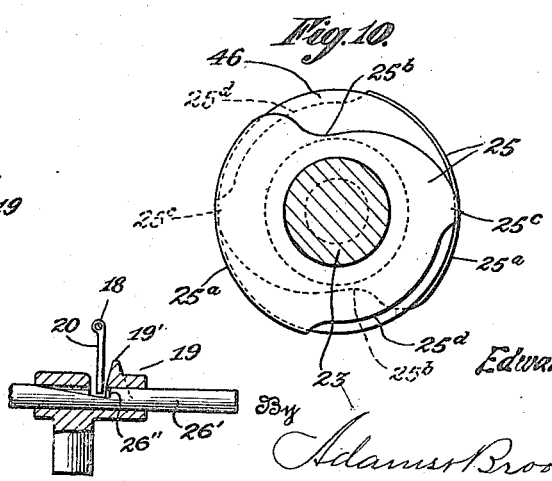
Fig. 10 is a detail illustrating more particularly the controlling cams of the locking and placing or depositing devices.

The cam 30 is adapted to effect a comparatively quick oscillation or stroke of its lever 29, followed by a pause of relatively long duration, during which pause or intermission the depositing devices place cans on the platforms of those scales 1, 51 at one side of conveyer belt 7, immediately following which a cam 25 engages roller 25' of a slide 11ᵃ and forces it and its switch actuator 21 slightly in a rearward direction, conveniently through its throw portion 25ᵃ (see Fig. 10) wiping said roller and thereby freeing member 20 so that it can be lifted out of the path of jaw 26 through lowering of the scale platform.

Throw portion 25ᵃ is elongated, as shown, and consequently a comparatively long period is insured in which the operation of weighing a can can be performed.

Following cam surface portion 25ᵃ is a depression 25ᵇ which, when member 20 is elevated permits of actuator 21 being projected forwardly, by spring 24, to adjust its switch 3 outwardly to guide the can, which will now be shifted from the platform of scale 1 by a rearward stroke of shifter 4, onto conveying means 5ᵃ.

Upon the scale 1 being thus relieved of the weight of the can, the weight on the beam serves to return its parts and member 20 to normal position, and as said member 20 is lowered, a quick rearward movement of actuator 21, permits of said member being again seated between jaw 26 and the fixed jaw or wall of guide 19. This last named rearward movement of actuator 21 is effected by the cam raised portion 25ᶜ, which latter is followed by a depression 25ᵈ which, extending to said raised portion 25ᵃ of the cam, insures, through member 20 being firmly held, of the scale platform being locked during the positioning of a can thereon by device 2.

Reference numeral 65 indicates drive rods guided in stands 66 for communicating the movement of the slides 11ᵃ to the slides 11 of the controlling mechanisms of scales 51, the said rods and slides being pivotally connected by studs 67 projecting through cutouts 68 of the adjacent guides, as more clearly shown in Figs. 4 to 7 inclusive. It will therefore be apparent that while the slides 11, 11ᵃ are connected in pairs and serve to transmit movement from the respective cams 25 to the related actuators 21, the latter are free of the slides 11, 11ᵃ and each can be moved forwardly independently of the other by its spring 24 whenever it is released by the depression of the corresponding scale and the consequent elevation of the holding member 20 controlled by said scale.

Briefly described, the operation is as follows: The cans to be sorted are placed on the portion 5 of the carrier belt, and will strike against the stop 36. The placing device 2, as already described, is continuously oscillated from the cam 46 on the drive shaft 23 through the medium of the lever 45 and the connections between said lever and the shaft 2' which carries the placing device. Alternate cans are thus transferred by said placing device from the belt 5 to the scale pans 1. During this placing action, the scale beams 10 are locked against movement by their depending holding elements 20 being clamped between the ends of the jaws 26 and the walls of the slots in which the elements 20 are located.

As soon as a can has been deposited on one of the scale pans 1 by the placing device 2, the cam 25 operates to push back the slide 11ᵃ, consequently moving forward the jaw 26 and releasing the scale holding element 20. If, therefore the can is of a predetermined weight or over such predetermined weight, the scale pan will move downwardly, swinging the arm of the scale beam, which carries the holding member 20 upwardly, and moving said holding member 20 out of the path of the plunger or jaw 26. The cam 25, continuing its movement, permits the slide 11ª to move forwardly and as there is nothing now to prevent the actuator 21 moving under the action of the spring 24, the shaft 3', and consequently the switch 3, will be turned to the position shown in dotted lines in Fig. 3. When this action has taken place, the cam 30 operates to swing the lever 29, and consequently the arm 4 sweeps across the scale pan and removes the can therefrom. Upon the next operation, the switch 3 is swung back to its normal position and the can is re-deposited on the portion 5ª of the belt. If, however, the can is less than the predetermined weight, it will not depress the scale pan 1, and consequently the holding element 20 will not move out of the path of the plunger or jaw 26, so that when the slide 11ª is released by the cam 25, the actuator 21 cannot move under the impulse of the spring 24, and therefore the switch 3 will remain in its normal position, as shown in full lines in Fig. 3. As a result, when the arm 4 sweeps the can from the scale pan 1 it will deliver it behind the switch 3, so that it will not be brought again to the conveyer belt.

The cans, which are re-delivered on to the portion 5ª of the conveyer belt pass on to the second set of sorting devices and against the rear guard or stop 36. Here alternate cans are placed upon the two scale pans 51 by the placing device 52, which as already described, is connected with the placing device 2 by the rod 60, and therefore operates simultaneously therewith. The second set of selecting or sorting mechanisms, as already explained, is for the purpose of separating cans of proper weight from those that are over-weight, and substantially the reverse of the above described operation takes place by reason of the reversed arrangement of the switches 53. That is to say, if a can of the proper weight is received by the scale pan 51, when the holding element 20 of the scale beam 10 of that scale pan is released by the rearward movement of the jaw 26", shown in Fig. 9, the scale will remain quiescent. As a result, the actuator cannot move under the impulse of its spring 24, for the element 20 being in the path of the jaw 26" prevents such movement. As the movement of the switch 53 depends on the movement of the actuator, said switch will remain in the position shown in full lines in Fig. 3, and therefore when the arm 54 sweeps the scale pan, the can removed by it from said scale pan will be in front of the switch arm 53, and in a position to be directed back on to the portion 6 of the conveyer belt. If, however, the can should be over weight, when the scale bearing it is released by the release of the holding element 20, then the scale pan will be depressed, the element 20 elevated out of the path of the jaw 26" of the plunger 26', and the spring 24 can then operate on the actuator and move it. This results in turning the shaft 53' and consequently the switch arm 53 to the dotted position shown in Fig. 3. When, therefore, the discharge arm 54 operates, it delivers the over-weight can behind said switch arm, which directs it away from the belt 6.

Having thus described my invention what I claim as new and desire to secure by Letters Patent of the United States of America, is:—

1. In apparatus of the character set forth, the combination with a weight-testing mechanism having a predetermined cycle of operation, of article-moving means associated therewith and having a timed relation thereto, an operating device for said moving means, and a connection between the operating device and moving means that normally maintains the timed relation of the latter to the weight-testing mechanism, but permits its stoppage under abnormal resistance to its movement.

2. In apparatus of the character set forth, the combination with a weight-testing mechanism having a predetermined cycle of operation, of article-moving means associated therewith and having a timed relation thereto, an operating device for said moving means, and a connection between the operating device and moving means that normally maintains the timed relation of the latter to the weight-testing mechanism, but permits its stoppage under abnormal resistance to its movement and automatically returns it to such timed relation when said abnormal resistance is removed.

3. In apparatus of the character set forth, the combination with companion weight-testing mechanisms having alternating predetermined cycles of operation, of article-moving means alternately coöperating with said mechanisms and having a timed relation therewith, an operating device for said moving means, and a connection between the operating device and moving means that normally maintains the timed relation of the latter to the weight-testing mechanisms, but permits its stoppage under abnormal resistance to its movement.

4. In apparatus of the character set forth, the combination with companion weight-testing mechanisms having alternating predetermined cycles of operation, of article-moving means alternately coöperating with said mechanisms and having a timed relation therewith, an operating device for said moving means, and a connection between the operating device and moving means that normally maintains the timed relation of the latter to the weight-testing mechanisms, but permits its stoppage under abnormal resistance to its movement, and automatically returns it to said timed relation when said abnormal resistance is removed.

5. In apparatus of the character set forth, the combination with weight-testing mechanism having a predetermined cycle of operation, of means for feeding articles to the weight-testing mechanism and having a timed relation thereto, an operating device for the feeding means, and a connection between the operating device and feeding means that normally maintains the timed relation of the latter to the weight-testing mechanism, but permits its stoppage under abnormal resistance to its movement.

6. In a weight testing machine, companion weight testing mechanisms, a placing device, and means for moving said placing device back and forth to feed to said mechanisms alternately, said means including drive and driven engaging members one of which is provided with a tapering seat and the other being yieldingly held in the seat of said first member.

7. In a weight testing machine, companion weight testing mechanisms, a placing device, means for moving said placing device back and forth to feed to said mechanisms alternately, said means including drive and driven engaging members one of which is provided with a seat having converging side walls, and a spring yieldingly pressing the other of said members into the seat of said first named member.

8. In apparatus of the character set forth, the combination with spaced weight-testing mechanisms having alternating cycles of operation, of means for delivering articles between the mechanisms, a placing device operating to deliver articles alternately to the weight-testing mechanisms, driving means for the placing device, and a connection between the driving means and the placing device that normally effects a timed operation of the same, but permits its stoppage under undue resistance and automatically returns it to the timed relation when such resistance is removed.

9. In a weight testing machine, companion weight testing mechanisms, a rock shaft, a placing device for feeding cans to said mechanisms alternately for weighing carried by said rock shaft, an engaging member on said rock shaft, and an oscillatory drive member having an engaging member for engagement with said first engaging member, one of said engaging members being free to yield when movement of said placing device is unduly resisted.

10. In a weight testing machine, companion weight testing mechanisms, a rock shaft, a placing device for feeding cans to said mechanisms alternately for weighing carried by said rock shaft, an engaging member on said rock shaft, a drive member mounted for oscillation on said rock shaft, an engaging member on said drive member for engagement with said first named engaging member, and means yieldingly holding one of said engaging members in its normal position.

11. In a weight testing machine, companion weight testing mechanisms, a rock shaft, a placing device for feeding cans to said mechanisms alternately for weighing carried by said rock shaft, an engaging member on said rock shaft, a drive member mounted for oscillation on said rock shaft, an engaging member on said drive member for engagement with said first named engaging member, means yieldingly holding one of said engaging members in its normal position, a drive shaft, a cam on said drive shaft, and means for oscillating said drive member engaged with said cam for movement thereby.

12. In a weight testing machine, companion weight testing mechanisms, a conveyer extending between said mechanisms, a placing device supported for movement across said conveyer for feeding to said testing mechanisms alternately, means for operating said placing device, and a driving connection between said means and said placing device that normally drives the same in timed relation to the weight testing mechanisms, while permitting of the device remaining idle through undue resistance to movement thereof.

13. In a weight-testing machine, a weight-testing mechanism, a swinging placing device, and a driving member having a frictional engagement with the placing device for normally moving the same positively in timed relation to the weight-testing mechanism and permitting said placing device to stop under abnormal resistance.

14. In a weight-testing machine, a weight-testing mechanism, a swinging placing device, and a driving member having a frictional engagement with the placing device for normally moving the same positively in timed relation to the weight-testing mechanism and permitting said placing device to stop under abnormal resistance, said engagement automatically returning the parts to normal relation when the abnormal resistance is removed.

15. In a weight testing machine, companion weight testing mechanisms, means for feeding articles to said mechanisms alternately for weighing, and means for operating said first named means including a driven element and a rotatably supported drive element having a yielding releasable connection with said driven element that secures a normal timed operation of the driven element, while permitting of the latter being held through undue resistance to its operation against movement with said drive element.

16. In a weight testing machine, weight testing mechanisms, a conveyer extending between said mechanisms, means for directing articles of or over a predetermined weight to said conveyer, and means for removing the articles from said conveyer and placing the same on the other of said testing mechanisms.

17. In a weight testing machine, weight testing mechanisms, means extending between said mechanisms for delivering articles from one to the other thereof, oscillatory devices for respectively removing articles from the testing mechanisms, and means common to both devices for operating said oscillatory devices in time with one another.

18. In apparatus of the character set forth, the combination with weighing mechanisms, of conveying means, means for transferring articles from the conveying means to one of the mechanisms, means controlled by the weighing mechanisms for returning certain of the articles to the conveying means, means for removing the returned articles to another weighing mechanism, and means under the control of the second weighing mechanism for returning certain of the articles to the conveying means.

19. In a weight testing machine, weight testing mechanisms, a conveying means common to both of said mechanisms for delivering from each and advancing tested articles from one thereof to the other, means under control of one of said mechanisms for directing those articles below a predetermined weight from the path of feed to the other mechanism, means for feeding articles from said conveying means to said other mechanism, and means under control of said other mechanism for directing those articles of a predetermined weight to said conveyer.

20. In apparatus of the character described, the combination with weighing mechanisms, of a conveyer operating between the mechanisms, means under control of one weighing mechanism for separating articles placed thereon and transferring certain of the same to the conveyer, means for removing the articles so transferred to another weighing mechanism, and means under control of the second weighing mechanism for separating the articles.

21. In a weight testing machine, weight testing mechanisms, an endless conveyer means extending on opposite sides of one of said mechanisms, means under control of the other of said mechanisms for directing tested articles to said conveyer means, means for removing articles from said conveyer means and placing the same on said first named mechanism, and means under control of said first named mechanism for directing tested articles from the latter to said conveyer means.

22. In a weight testing machine, weight testing mechanisms, an endless conveyer means extending on opposite sides of one of said mechanisms, means under control of the other of said mechanisms for directing tested articles to said conveyer means, means for removing articles from said conveyer means and placing the same on said first named mechanism, and means normally arranged for directing tested articles from said first named mechanism to said conveyer adjustable by such mechanism across the path of the articles to said conveyer means.

23. In a weight testing machine, weight testing mechanisms, an endless conveyer means extending between said mechanisms and beyond one thereof, switch means normally set for directing articles from said last named mechanism to said conveyer means, said switch means being under control of said last named mechanism for adjustment across the path of the articles to said conveyer means, and switch means under control of the other of said mechanisms normally set across the path of feed from the latter to said conveyer means.

24. In a weight testing machine, weight testing mechanisms, means for advancing tested articles to one of said mechanisms, switch means under control of the other of said mechanisms for directing articles of or above a predetermined weight to said first means, switch means under control of said first named mechanism for directing cans according to weight to different points, and means for ejecting the articles from said testing mechanisms against the adjacent switch means.

25. In a weight testing machine, a weight testing mechanism, companion weight testing mechanisms, means under control of said first mechanism for separating those articles of less than a predetermined weight from those of or above such weight, and means for feeding the last named class of articles from the first mechanism to said companion weight testing mechanisms alternately.

26. In a weight testing machine, a weight testing mechanism, companion weight testing mechanisms, means under control of said first mechanism for separating those articles of less than a predetermined weight from those of or above such weight, means for feeding the last named class of articles from the first mechanism to said companion weight testing mechanisms alternately, and means under control of said companion weight testing mechanisms for separating those articles of a predetermined weight from the heavier articles.

27. In a weight testing machine, a weight testing mechanism, means for removing articles from the weight testing mechanism, companion weight testing mechanisms, means for advancing articles of or above a predetermined weight between said companion mechanisms, means supported for to and fro movement for placing the advanced articles on said companion mechanisms alternately, and switch means under control of said first named testing mechanism for separating the relatively light articles from those to be advanced by said first means.

28. In a weight testing machine, conveying means, weight testing mechanisms at the side of the path of said conveying means, means for removing articles from said conveying means and placing the same on one of said mechanisms, means under control of and at the delivery side of said last named mechanism for assorting and directing articles of one class to said conveying means for advancement to the other of said testing mechanisms, and means for removing the last named articles from said conveying means and placing the same on the said other of said testing mechanisms.

29. In a weight testing machine, conveying means, weight testing mechanisms at the side of the path of said conveying means, means for removing articles from said conveying means and placing the same on one of said mechanisms, means under control of and at the delivery side of said last named mechanism for assorting and directing articles of one class to said conveying means for advancement to the other of said testing mechanisms, means for removing the last named articles from said conveying means and placing the same on the said other of said testing mechanisms, and means for assorting the articles tested by said other testing mechanism and directing those of one class to said conveying means.

30. In a weight testing machine, a weight testing mechanism, a locking means for holding said mechanism against operation, a pivotally supported pendant member connected with said mechanism and normally in locking engagement with said locking means, and automatic means for operating said locking means for releasing said member after an article has been placed on the weight testing mechanism.

31. In a weight testing machine, a weight testing mechanism, a locking means for holding said mechanism against operation, a bodily and swingingly movable member connected with said mechanism and normally in locking engagement with said locking means, and automatic means for operating said locking means for releasing said member after an article has been placed on the weight testing mechanism.

32. In a weight testing machine, a weight testing mechanism, a locking means for holding said mechanism against operation, a member normally in locking engagement with said locking means connected with said mechanism and free thereof for relative swinging, and automatic means for operating said locking means to release said member after an article has been placed on the weight testing mechanism.

33. In a weight testing machine, a weight testing mechanism, a locking means for holding said mechanism against operation, a member normally in locking engagement with said locking means connected with said mechanism for vertical bodily movement and free thereof for relative swinging, and automatic means for operating said locking means to release said member after an article has been placed on the weight testing mechanism.

34. In a weight testing machine, a pair of weight testing mechanisms, placing devices each associated with a respective one of said mechanisms for advancing articles thereto for weighing, driving means, and connections between said driving means and said placing devices for effecting positive movements of the same under normal conditions, but permitting either to stop under abnormal resistance.

35. In a weight testing machine, a pair of weight testing mechanisms, placing devices each associated with a respective one of said mechanisms for feeding articles thereto for weighing, means for advancing articles tested by one of said mechanisms to the placing device of the other of said mechanisms, means at the delivery side of and under control of the first named of said mechanisms for directing articles of or over a predetermined weight to the said first named means, a drive means, and means connecting both of said placing devices with said drive means for operation thereby.

36. In a weight testing machine, a weight testing mechanism, means for ejecting articles from said mechanism, a switch for directing the articles ejected by said means, an actuator for said switch, a locking element for said actuator, and means for operating said locking element to a releasing position comprising a drive means and an intermediate relatively movable member for communicating the movement of said drive means to said locking element.

37. In a weight testing machine, a weight testing mechanism, means for ejecting articles from said mechanism, a switch for directing the articles ejected by said means, an actuator for said switch comprising a slide, a second slide engaged with said actuator slide, a cam for shifting said slides in one direction, and means under control of said testing mechanism for controlling the operation of said actuator slide in the reverse direction.

38. In a weight testing machine, weight testing mechanisms, switches under control of said mechanisms, means for locking said mechanisms against weighing, actuators for said switches, springs for operating said actuators, and means movable independently of said actuators for operating the same against the action of said springs.

39. In a weight testing machine, weight testing mechanisms, switches under control of said mechanisms, means for locking said mechanisms against weighing, actuators for said switches comprising slides, springs for operating said slides and said locking means in one direction, and means for moving said actuators in the opposite direction free thereof for independent movement.

40. In a weight testing machine, weight testing mechanisms, switches under control of said mechanisms, means for locking said mechanisms against weighing, actuators for said switches comprising slides, springs for operating said slides and said locking means in one direction, means for moving said actuators in the opposite direction free thereof for independent movement comprising slides, a rod connecting said last named slides, and a cam operatively connected with one of said last named slides for shifting the same.

41. In a weight testing machine, the combination with conveying mechanism, of testing means located at one point along the conveying mechanism for separating articles of two characters from those of a third character, means for transferring articles from the conveying means to said testing means, means for returning the articles of two characters back to the conveying means, a second testing means at another point for separating articles of two characters, and means for transferring the said returned articles from the conveying means to the second testing means.

42. In a weight testing machine, the combination with conveying mechanism, of testing means located at one point along the conveying mechanism for separating articles of two characters from those of a third character, means for transferring articles from the conveying means to said testing means, means for returning the articles of two characters back to the conveying means, a second testing means at another point for separating the articles of two characters, means for transferring the said returned articles from the conveying means to the second testing means, and means for returning the separated articles of one character from the second testing means to the conveying mechanism.

43. In a weight testing machine, the combination with conveying mechanism, of testing means located at one point along the conveying mechanism for separating articles of a predetermined weight and an over-weight from those of an under-weight, means for transferring articles from the conveying means to said testing means, means for returning the articles of a predetermined weight and over-weight back to the conveying means, a second testing means for separating the articles of a predetermined weight from those of an over-weight, said latter means being located at another point along the conveying means, means for transferring said returned articles from the conveying mechanism to the second testing means, and means for returning one set of articles separated by the second testing means to the conveying mechanism.

Signed at Seattle, Washington, this 25th day of October 1912.

EDWARD H. WAUGH.

Witnesses:
CASSIUS E. GATES,
CLARA A. HARM.

Copies of this patent may be obtained for five cents each, by addressing the "Commissioner of Patents, Washington, D. C."